United States Patent
Faruque et al.

(10) Patent No.: US 12,434,658 B1
(45) Date of Patent: Oct. 7, 2025

(54) DOWNWARDLY INFLATABLE VEHICLE AIRBAG

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/761,412

(22) Filed: Jul. 2, 2024

(51) Int. Cl.
*B60R 21/232* (2011.01)
*B60R 21/214* (2011.01)
*B60R 21/231* (2011.01)
*B60R 21/2338* (2011.01)

(52) U.S. Cl.
CPC .......... *B60R 21/232* (2013.01); *B60R 21/214* (2013.01); *B60R 2021/23153* (2013.01); *B60R 21/2338* (2013.01)

(58) Field of Classification Search
CPC ... B60R 21/214; B60R 21/232; B60R 21/233; B60R 21/2338; B60R 2021/23153; B60R 2021/23161; B60R 2021/23308; B60R 2021/23386; B60R 2021/23388
See application file for complete search history.

(56) References Cited

U.S. PATENT DOCUMENTS

| | | | |
|---|---|---|---|
| 3,731,949 A | 5/1973 | Radke | |
| 3,774,936 A * | 11/1973 | Barnett | B60R 21/214 |
| | | | 280/730.1 |
| 6,431,588 B1 * | 8/2002 | Bayley | B60R 21/232 |
| | | | 280/730.2 |
| 7,195,276 B2 * | 3/2007 | Higuchi | B60R 21/231 |
| | | | 280/743.1 |
| 7,350,804 B2 * | 4/2008 | Bakhsh | B60R 21/232 |
| | | | 280/730.2 |
| 7,775,551 B2 | 8/2010 | Bowers | |
| 8,573,634 B2 | 11/2013 | Choi et al. | |
| 9,327,669 B2 * | 5/2016 | Jaradi | B60R 21/08 |
| 9,725,064 B1 | 8/2017 | Faruque et al. | |
| 9,902,362 B2 | 2/2018 | Farooq et al. | |
| 9,994,182 B1 | 6/2018 | Jaradi et al. | |
| 10,471,923 B2 * | 11/2019 | Jimenez | B60R 21/214 |
| 11,059,448 B2 | 7/2021 | Rutelin et al. | |
| 11,267,431 B2 | 3/2022 | Sekizuka | |
| 11,884,228 B2 * | 1/2024 | Jaradi | B60R 21/20 |
| 12,071,094 B2 * | 8/2024 | Farooq | B60R 21/213 |

FOREIGN PATENT DOCUMENTS

JP 2021024487 A * 2/2021

* cited by examiner

*Primary Examiner* — Laura Freedman
(74) *Attorney, Agent, or Firm* — Frank A. MacKenzie; Brooks Kushman P.C.

(57) ABSTRACT

An airbag assembly includes an uninflatable segment having a top end. The airbag assembly includes an airbag segment inflatable to an inflated position. The airbag segment is supported by the uninflatable segment in the inflated position. A conduit segment is fixed to the uninflatable segment and defines a gas passageway in fluid communication with the airbag segment. The conduit segment is elongated along a first axis transverse to the top end of the uninflatable segment, and the airbag segment is elongated along a second axis transverse to the first axis.

18 Claims, 5 Drawing Sheets

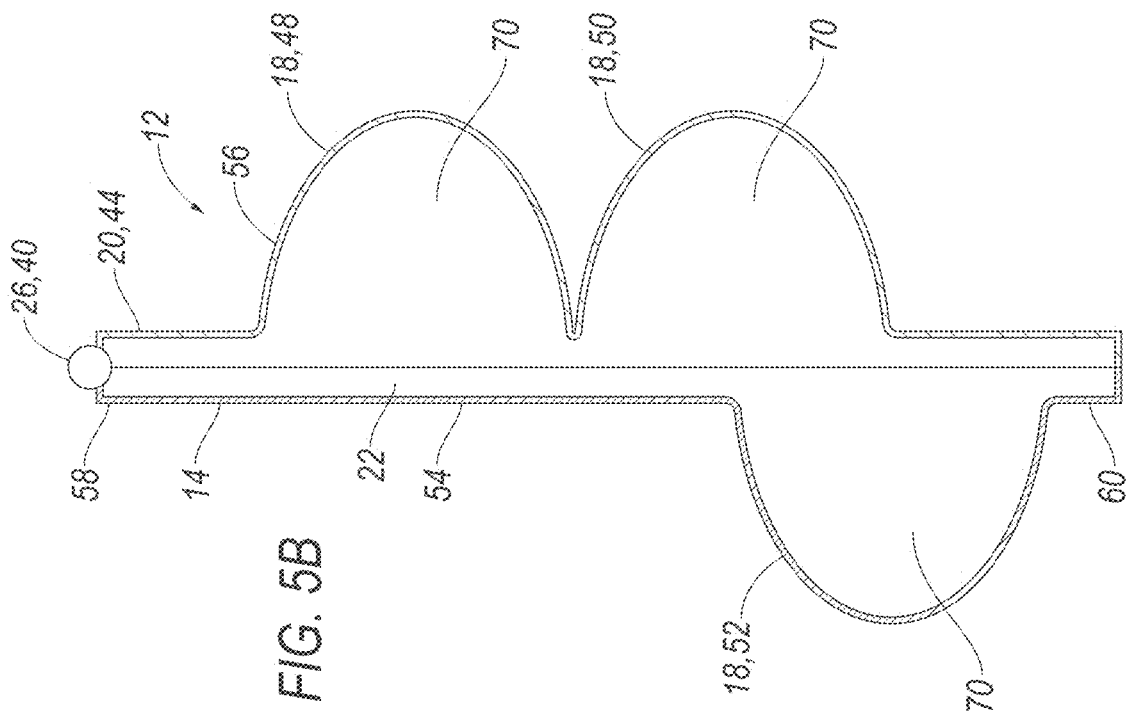
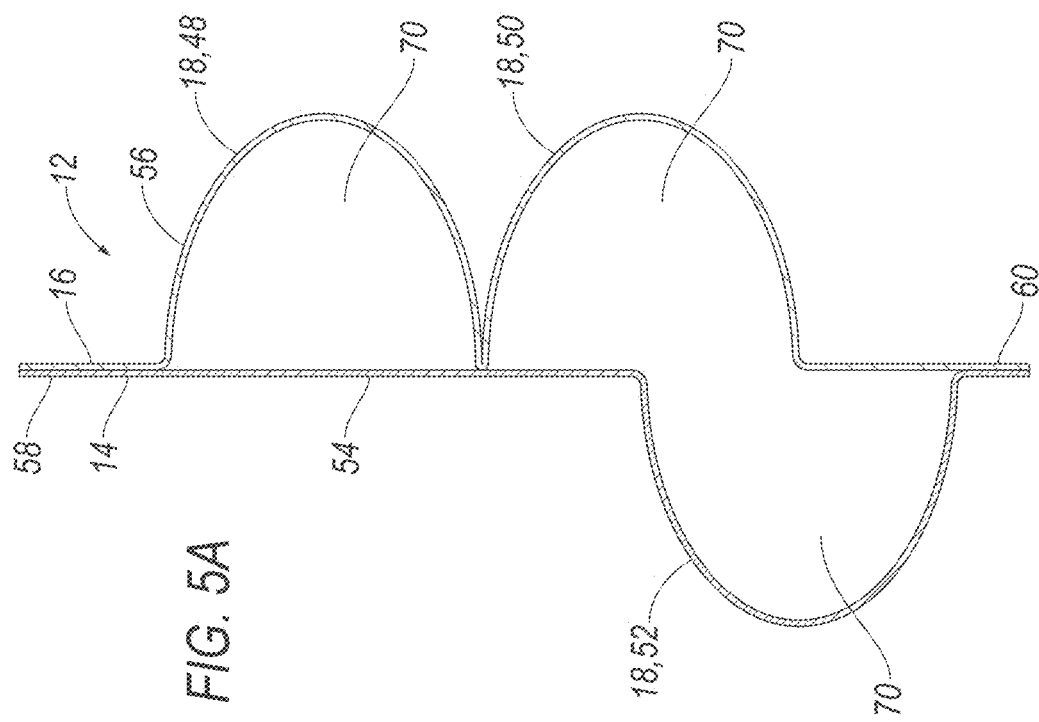

DOWNWARDLY INFLATABLE VEHICLE AIRBAG

BACKGROUND

A vehicle may include one or more airbags deployable during certain vehicle impacts to control kinematics of occupants inside the vehicle. The airbag may be a component of an airbag assembly including a housing supporting the airbag, and an inflator in communication with the airbag for inflating the airbag from an uninflated position to an inflated position.

BRIEF DESCRIPTION OF THE DRAWINGS

FIG. 5A is a cross-section through line 5A of FIG. 4.

FIG. 5B is a cross-section through line 5B of FIG. 4.

DETAILED DESCRIPTION

Figure 1:
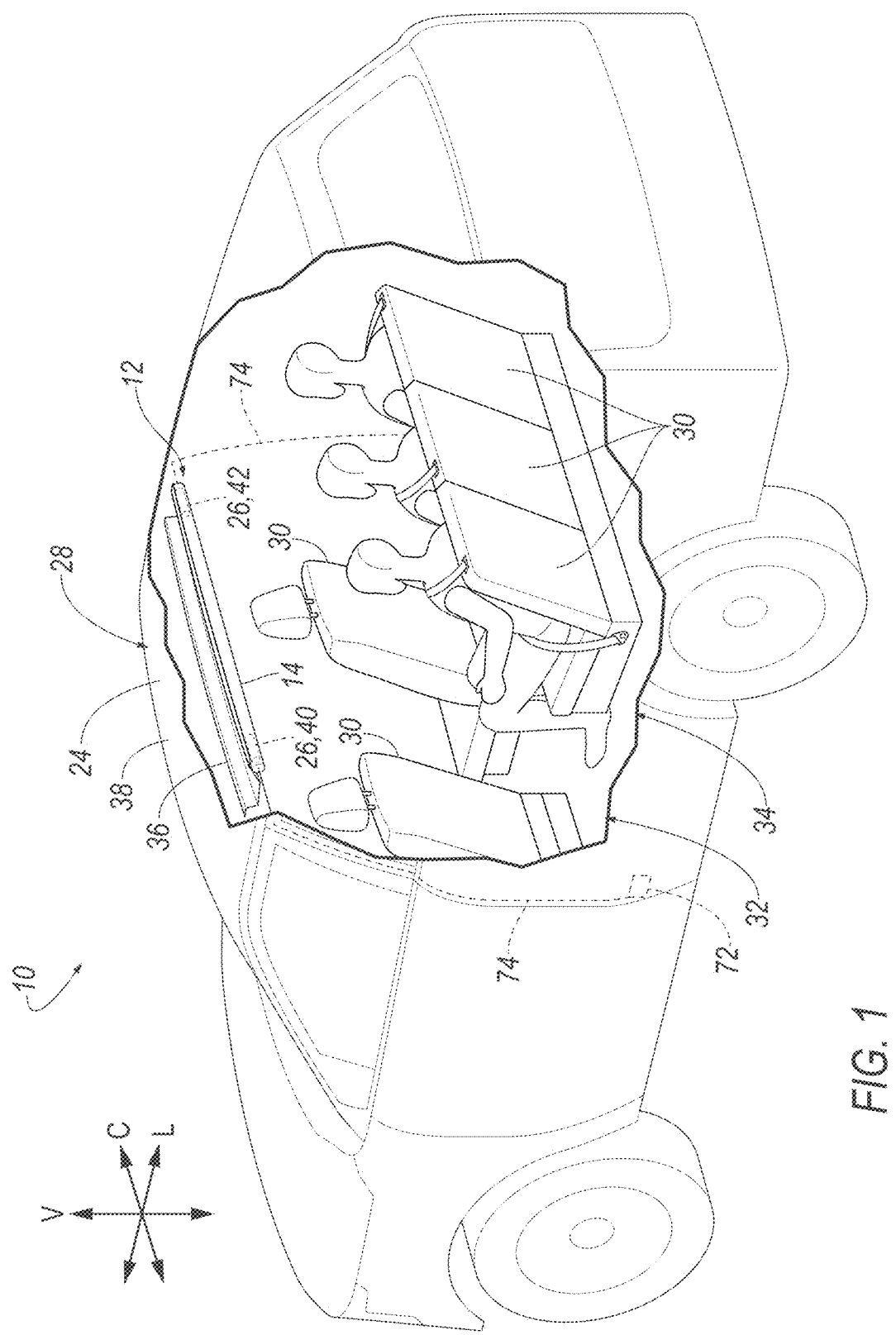
FIG. 1 is a perspective view of a passenger cabin of a vehicle with an airbag in an uninflated position.

With reference to the Figures, wherein like numerals indicate like parts throughout the several views, an airbag assembly 12 for a vehicle 10 includes an airbag 14 having an uninflatable segment 16 having a top end 58. An airbag segment 18 is inflatable to an inflated position. The airbag segment 18 is supported by the uninflatable segment 16 in the inflated position. A conduit segment 20 is fixed to the uninflatable segment 16 and defines a gas passageway 22 in fluid communication with the airbag segment 18. The conduit segment 20 is elongated along a first axis A1 transverse to the top end 58 of the uninflatable segment 16, i.e., the longest dimension of the conduit segment 20 is along the first axis A1. The airbag segment 18 is elongated along a second axis A2 transverse to the first axis A1, i.e., the longest dimension of the airbag segment 18 is along the second axis A2.

The vehicle 10 includes a vehicle body 24. An inflator 26 is supported by the vehicle body 24. The airbag 14 is inflatable by the inflator 26 from an uninflated position to the inflated position. The uninflatable segment 16 is supported by the vehicle body 24 in the uninflated position and in the inflated position. The conduit segment 20 is supported by the uninflatable segment 16 in the inflated position. The conduit segment 20 extends from the inflator 26 to the airbag segment 18 and is fluidly connecting the airbag segment 18 to the inflator 26.

The conduit segment 20 supplies inflation medium from the inflator 26 to the airbag segment 18 to inflate the airbag segment 18 without inflating the uninflatable segment 16. In some examples, including the example shown in the Figures, the airbag assembly 12 may be supported by a roof 28 of the vehicle 10. In such an example, the airbag assembly 12 may extend downwardly from the roof 28 to a space between a front row 32 of seats 30 and a rear row 34 of seats 30. Both the uninflatable segment 16 may be between the front row 32 and the rear row 34 in the inflated position. The airbag 14 may include more than one conduit segment 20 and more than one airbag segment 18, as shown in the example in the Figures.

The vehicle 10 may be any suitable type of automobile, e.g., a passenger or commercial automobile such as a sedan, a coupe, a truck, a sport utility vehicle 10, a crossover vehicle 10, a van, a minivan, a taxi, a bus, etc.

With reference to FIG. 1, the vehicle 10 defines a vehicle-longitudinal axis L extending between a front end and a rear end of the vehicle 10. The vehicle 10 defines a cross-vehicle axis C extending cross-vehicle from one side to the other side of the vehicle 10. The vehicle 10 defines a vertical axis V extending through a floor and the roof 28 of the vehicle 10. The vehicle-longitudinal axis L, the vehicle-lateral axis C, and the vertical axis V are perpendicular relative to each other.

The vehicle body 24 may be of a unibody construction in which a vehicle frame and the vehicle body 24 are unitary (including frame rails, pillars, roof rails, etc.). As another example, the vehicle body 24 and a vehicle frame may have a body-on-frame construction (also referred to as a cab-on-frame construction) in which the vehicle body 24 and vehicle frame are separate components, i.e., are modular, and the body is supported on and affixed to the frame. Alternatively, the vehicle body 24 may have any suitable construction. The vehicle body 24 may be of any suitable material, for example, steel, aluminum, and/or fiber-reinforced plastic, etc.

The vehicle body 24 includes body panels. The body panels may include structural panels, e.g., rockers, pillars, roof rails, etc. The body panels may include exterior panels. The exterior panels may present a class-A surface, e.g., a finished surface exposed to view by a customer and free of unaesthetic blemishes and defects. The body panels include, e.g., a roof panel 38, doors, fenders, hood, decklid, etc. The vehicle body 24 may define a passenger cabin to house occupants of the vehicle 10.

The roof 28 covers the passenger cabin above the passenger cabin. The roof 28 may include crossbeams 36, an exterior roof panel 38, and a headliner. The crossbeams 36 support the exterior roof panel 38, the headliner, etc. The crossbeams 36 may be steel, aluminum, carbon fiber, or any other suitable material. The crossbeams 36 may be elongated along the vehicle-lateral axis. The headliner and the exterior panel provide class-A surfaces to the roof 28, i.e., surfaces specifically manufactured to have a high-quality, finished aesthetic appearance free of blemishes, etc.

The headliner may include a tear seam. The tear seam is designed to rupture upon inflation of the airbag 14. The tear seam may be weaker than a portion of the headliner adjacent the tear seam, e.g., the tear seam may be thinner, a weaker material, etc. The tear seam may connect panels of the headliner, e.g., with breakaway stitches. The tear seam may extend along the vehicle-lateral axis C.

The vehicle 10 includes one or more seats 30. The vehicle 10 may include any suitable number of seats 30. The seats 30 may be arranged in the passenger cabin in any suitable position, i.e., as front seats, rear seats, third-row seats, etc. In the example shown in the Figures, the vehicle 10 includes a front row 32 of seats 30 and a rear row 34 of seats 30. The seat 30 may be movable relative to the floor to various positions, e.g., movable fore-and-aft and/or cross-vehicle. The seats 30 may be of any suitable type, e.g., a bucket seat.

The seat 30 includes the seatback and a seat bottom. The seatback may be supported by the seat bottom and may be stationary or movable relative to the seat bottom. The seatback and the seat bottom may be adjustable in multiple degrees of freedom. Specifically, the seatback and the seat bottom may themselves be adjustable, in other words, adjustable components within the seatback and/or the seat bottom, and/or may be adjustable relative to each other.

The seatback may define an occupant seating area. The occupant may be disposed in the occupant seating area, as shown in the Figures. The occupant seating area may be on a front side of the seatback. The side airbag 14 may extend from the seatback next to the occupant seating area to control occupant kinematics.

The airbag assembly 12 includes the airbag 14 and at least one inflator 26. The inflator 26 inflates the airbag 14 to the inflated position. The airbag assembly 12 is inflatable from the uninflated position to the inflated position. Specifically, the airbag 14 of the airbag assembly 12 is inflatable from the uninflated position to the inflated position. The airbag assembly 12 is supported by the vehicle body 24 in the uninflated position and in the inflated position. In other words, the weight of the airbag assembly 12 is borne by the vehicle body 24 in the uninflated position and the inflated position. Specifically, the weight of the airbag 14 is borne by the vehicle body 24 in the uninflated position and the inflated position. In the example shown in the Figures, the airbag 14 and the inflator 26 are supported by the roof 28, specifically the crossbeam 36 of the roof 28, in the uninflated position and the inflated position.

The airbag 14 and the inflator 26 may be supported by the vehicle body 24, e.g., the crossbeam 36 of the roof 28, by direct attachment or indirect attachment. In the example shown in the Figures, the airbag 14 and the inflator 26 are directly attached to the vehicle body 24, e.g., the crossbeam 36 of the roof 28. In such examples, clips, threaded fasteners, straps, etc., may directly attach the airbag 14 and/or inflator 26 to the vehicle body 24. In other examples, the airbag assembly 12 may include a housing that houses and supports the airbag 14 in the uninflated position and supports the airbag 14 in the inflated position. In such examples, the airbag 14 may be attached to the housing and rolled and/or folded to fit within the housing in the uninflated position. The housing may be of any suitable material, e.g., a rigid polymer, a metal, a composite, or a combination of rigid materials. The airbag 14 housing may, for example, include clips, threaded fasteners, etc., for attaching the housing to the floor. In examples including the housing, the inflator 26 may be attached to the housing and may be housed in the housing.

The inflator 26 is in fluid communication with the airbag 14 to inflate the airbag 14 to the inflated position. In the example shown in the Figures, the airbag assembly 12 includes two inflators 26, namely a first inflator 40 and a second inflator 42. The first inflator 40 supplies inflation medium to a first conduit segment 44 and the second inflator 42 supplies inflation to a second conduit segment 46. In some examples, the first inflator 40 may be at least partially in the first conduit segment 44 to deliver inflation medium directly to the first conduit segment 44, and the second inflator 42 may be at least partially in the second conduit segment 46 to deliver inflation medium direction to the second conduit segment 46. As another example, the first inflator 40 and the second inflator 42 may be fluidly connected to the first conduit segment 44 and the second conduit segment 46, respectively, through fill tubes, diffusers, etc. As another example, in examples including more than one conduit segment 20, one inflator 26 may be connected to more than one conduit segment 20 to supply inflation medium to more than one conduit segment 20. The inflator 26 may be, for example, a pyrotechnic inflator 26 that ignites a chemical reaction to generate the inflation medium, a stored gas inflator 26 that releases (e.g., by a pyrotechnic valve) stored gas as the inflation medium, or a hybrid.

The airbag 14 includes the uninflatable segment 16 and at least one airbag segment 18 and at least one conduit segment 20. In the example shown in the Figures, the airbag 14 includes three airbag segments 18, namely a first airbag segment 48, a second airbag segment 50, a third airbag segment 52, and two conduit segments 20, namely a first conduit segment 44 and a second conduit segment 46. In other examples, the airbag 14 may include any suitable number of uninflatable segments 16, airbag segments 18, and conduit segments 20. As set forth further below, the airbag 14 may include panels, e.g., a first panel 54 and a second panel 56, defining the uninflatable segment 16, the airbag segments 18, and the conduit segments 20.

The airbag 14 (including, for example, a first panel 54, a second panel 56, the uninflatable segment 16, the airbag segment(s) 18, and the conduit segment(s) 20) may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

In the example shown in the Figures, the airbag 14 is inflatable downwardly from the vehicle roof 28 to the inflated position. The airbag 14 may be packaged above the passenger compartment, e.g., above the headliner, in the uninflated position. As set forth above, the airbag 14 may be supported by the vehicle body 24, e.g., the crossbeam 36 of the roof 28, in the uninflated position in such an example. Upon activation of the inflator 26, the airbag 14 deploys downwardly to the inflated position. In the inflated position, the airbag 14 remains connected to and supported by the vehicle body 24, e.g., the crossbeam 36 of the roof 28, and the airbag 14 extends downwardly from the roof 28 into the passenger compartment.

The uninflatable segment 16 may be supported directly by the vehicle body 24, e.g., the crossbeam 36 of the roof 28, in the uninflated position and in the inflated position. The uninflatable segment 16 may be attached to the vehicle body 24 with clips, threaded fasteners, straps, etc., in both the uninflated position and the inflated position. The uninflatable segment 16 extends downwardly in a direction away from the vehicle roof 28 in the inflated position. As the inflator 26 supplies inflation medium to the conduit segment 20, the inflation medium flows through the conduit segment 20 to the airbag segment 18 to expand the airbag 14 to the inflated position, and the conduit segment 20 and the airbag segment 18 drive the uninflatable segment 16 downwardly away from the roof 28 to the inflated position. For example, in the example shown in the Figures, the multiple conduit segments 20 and airbag segments 18 drive the uninflatable segment 16 downwardly away from the roof 28 to the inflated position.

In the inflated position, the conduit segment 20 and/or the airbag segment 18 may be supported by the uninflatable segment 16 and/or the inflator 26. The conduit segment 20 and the airbag segment 18 may be supported by the roof 28 through the uninflatable segment 16 and/or the inflator 26. As an example, the conduit segment 20 may be supported by the roof 28 through the uninflatable segment 16, as shown in the example in the Figures. In such an example, the weight of the conduit segment 20 is borne by the roof 28 through the uninflatable segment 16. In the example shown in the Figures, the conduit segment 20 is also supported by the inflator 26. In such an example, the weight of the conduit segment 20 is borne in part by the inflator 26 through the connection between the inflator 26 and the conduit segment 20 and in part by the uninflatable segment 16 through the connection between the uninflatable segment 16 and the conduit. In such an example, the weight of the conduit segment 20 is borne by the roof 28 indirectly through the inflator 26 and the uninflatable segment 16. In the example shown in the Figures, the first conduit segment 44 is supported by the uninflatable segment 16 and the first inflator 40, and the second conduit segment 46 is supported by the uninflatable segment 16 and the second inflator 42.

The airbag segment 18 may be supported by the roof 28 through the inflator 26 and the uninflatable segment 16, as shown in the example in the Figures. As an example, the airbag segment 18 may be supported by the roof 28 through the uninflatable segment 16, as shown in the example in the Figures. In such an example, the weight of the airbag segment 18 is borne by the roof 28 through the uninflatable segment 16. In the example shown in the Figures, the airbag segment 18 is also supported by the inflator 26 through the conduit segment 20. In such an example, the weight of the airbag segment 18 is borne in part by the inflator 26 through the conduit segment 20 and in part by the uninflatable segment 16 through the connection between the uninflatable segment 16 and the airbag segment 18. In such an example, the weight of the airbag segment 18 is borne by the roof 28 indirectly through the inflator 26 and the uninflatable segment 16. In the example shown in the Figures, the first airbag segment 48, the second airbag segment 50, and the third airbag segment 52 are supported by the roof 28 through the uninflatable segment 16, the first inflator 40, and the second inflator 42.

In the inflated position, the airbag 14 extends downwardly in a plane P. The airbag 14 may extend across the passenger cabin. In the example shown in the Figures, the airbag 14 extends downwardly in a plane P that is generally parallel to the vertical axis V and the vehicle-lateral axis C. The uninflatable segment 16 may be on the plane P, and the conduit segment 20 and airbag segment 18 may on the plane P and protruding outwardly from the plane P, e.g., vehicle forward and/or vehicle forward.

In the example shown in the Figures, the airbag 14 in the inflated position is between the front row 32 of seats 30 and the rear row 34 of seats 30. The airbag 14 in the example in the Figures extends cross vehicle 10 across each of the seats 30 of the front row 32 of seats 30 and rear row 34 of seats 30. In the example shown in the Figures, the first airbag segment 48 and the second airbag segment 50 extend vehicle-rearward from the uninflatable segment 16 toward the rear row 34 of seats 30, and the third airbag segment 52 extends vehicle-forward from the uninflatable segment 16 toward the front row 32 of seats 30.

The uninflatable segment 16 includes a top end 58 and a bottom end 60. In the inflated position, the top end 58 is connected to the vehicle body 24, e.g., the crossbeam 36 of the roof 28, and the bottom end 60 is below the top end 58, i.e., at a position vertically lower than the top end 58. The top end 58 and the bottom end 60 may be in a generally vertical plane in some examples, i.e., aligned along the vehicle-longitudinal axis, and in other examples, the bottom end 60 may be vehicle forward or vehicle forward of the top end 58 along the vehicle-longitudinal axis. The uninflatable segment 16 has a left end 62 and a right end 64 spaced from each other in a cross-vehicle direction. The left end 62 and the right end 64 may be aligned with each other along the vehicle-longitudinal axis in some examples, as shown in the example in the Figures.

The uninflatable panel is not in fluid communication with the inflator 26, the gas passageway 22 of the conduit segment 20, nor an inflation chamber 70 of the airbag 14. The uninflatable panel is not inflated when the gas passageway 22 and the inflation chamber 70 are inflated. In other words, the uninflatable panel is separated from any gas passageway 22 and inflation chamber 70 of the airbag 14. The uninflatable panel does not include a chamber inflatable by inflation medium.

The conduit segment 20 is supplied with inflation medium by the inflator 26. The conduit segment 20 extends from the inflator 26 to the airbag segment 18 and fluidly connects the airbag segment 18 to the inflator 26. The gas passageway 22 of the conduit segment 20 is in fluid communication with the airbag segment 18. The inflation medium flows through the gas passageway 22 of the conduit segment 20 to the airbag segment 18 to inflate the airbag segment 18. In the example shown in the Figures, the first conduit segment 44 extends from the first inflator 40 to the first airbag segment 48, the second airbag segment 50, and the third airbag segment 52; and the second conduit segment 46 extends from the second inflator 42 to the first airbag segment 48, the second airbag segment 50, and the third airbag segment 52.

The conduit segment 20 may be elongated downwardly away from the inflator 26, as shown in the example in the Figures, i.e., the longest dimension of the conduit segment 20 may be downwardly away from the inflator 26. The conduit segment 20, i.e., the first conduit segment 44 and the second conduit segment 46 in the example shown in the Figures is elongated downwardly in a direction away from the vehicle roof 28. Specifically, the conduit segment 20 may be elongated in a generally vertical plane in some examples and may be offset from vertical in other examples.

The conduit segment 20 is fixed to the uninflatable segment 16 and moves with the uninflatable segment 16 from the uninflated position to the inflated position. As set forth further below, the conduit segment 20, e.g., the first conduit segment 44 and the second conduit segment 46 in the example shown in the Figures, is formed by connections lines between the conduit segment 20 and the uninflatable segment 16.

The conduit defines the gas passageway 22 between the inflator 26 and the airbag segment 18, as set forth above. As one example, the conduit segment 20 is formed by stitching between uninflatable segment 16 and the conduit segment 20, as described further below. The inflator 26 is in fluid communication with the gas passageway 22 of the conduit segment 20. As set forth above, in some examples the inflator 26 may extend into the conduit segment 20, and in such examples, the inflator 26 may be fixed to the gas passageway 22, e.g., with clips, straps, etc. In the example shown in the Figures, the first inflator 40 is fixed to and in fluid communication with the first gas passageway 22 and the second inflator 42 is fixed to and in fluid communication with the second gas passageway 22. In the example shown in the Figures, the first conduit segment 44 and the second conduit segment 46 are in fluid communication with the first airbag segment 48, the second airbag segment 50, and the third airbag segment 52.

The airbag segment 18 defines an inflation chamber 70 that is in fluid communication with the gas passageway 22 of the conduit segment 20, e.g., the first conduit segment 44 and the second conduit segment 46. The inflation chamber 70 is inflatable by the inflation medium supplied through the conduit segment 20 from the inflator 26. The airbag 14, i.e., the material of the airbag 14, is designed, i.e., sized, shaped, and positioned, to define the inflation chamber 70. In the example shown in the Figures, the first airbag segment 48, the second airbag segment 50, and the third airbag segment 52 each define an inflation chamber 70 in fluid communication with the first conduit segment 44 and the second conduit segment 46.

The airbag segment 18 is elongated cross-vehicle. The conduit segment 20 may be elongated along a first axis A1 transverse to the top end 58 of the uninflatable segment 16, and the airbag segment 18 may be elongated along a second axis A2 transverse to the first axis A1. In the example shown in the Figures, the first conduit segment 44 and the second conduit segment 46 are elongated along the first axis A1 and the first airbag segment 48, the second airbag segment 50, and the third airbag segment 52 are elongated along the second axis A2.

In examples including more than one airbag segment 18, the airbag segments 18 may protrude in opposite directions from the uninflatable segment 16 in the inflated position. In the example shown in the Figures, the first airbag segment 48 and the second airbag segment 50 protrude vehicle forward from the uninflatable segment 16, and the third airbag segment 52 protrudes vehicle forward from the uninflatable segment 16. In such an example, the first airbag segment 48 and the second airbag segment 50 protrude toward occupants in the rear row 34 of seats 30, and the third airbag segment 52 protrudes toward the seatbacks of the front row 32 of seats 30.

The airbag assembly 12 includes panels 54, 56, and, in such examples, the conduit segment 20 (e.g., the first conduit segment 44 and the second conduit segment 46) and the airbag segments 18 (i.e., the three airbag segments 18) are defined by the panels 54, 56. The panels 54, 56 are connected to each other to define the conduit segment 20 and the airbag segment 18. The inflation medium from the inflator 26 flows between the panels 54, 56 to inflate airbag assembly 12 to the inflated position. The panels 54, 56 and/or the connection between the panels 54, 56 are designed so that the panels 54, 56 take the shape of the conduit segment 20 and airbag segment 18 when inflated. In the example shown in the Figures, the airbag assembly 12 includes two panels, namely a first panel 54 and a second panel 56, that define all of the conduit segments 20 and airbag segments 18, e.g., the first conduit segment 44, the second conduit segment 46, the first airbag segment 48, the second airbag segment 50, and the third airbag segment 52 in the example shown in the Figures. In other examples, the airbag assembly 12 may include more than two panels.

One of the panels 54, 56 forms one side of the conduit segment 20 and the other of the panels 54, 56 forms the other side of the conduit segment 20. In the example shown in the Figures, the first panel 54 and the second panel 56 are fixed to each other defining the first conduit segment 44 between the first panel 54 and the second panel 56 and defining the second conduit segment 46 between the first panel 54 and the second panel 56. In other words, both conduit segments 20 are defined between the same two panels 54, 56. In the example shown in the Figures, one panel 54 defines a vehicle-forward half of the conduit segment 20 and the other panel 56 defines a vehicle-rearward half of the conduit segment 20. As another example, one panel 54, 56 may extend across both conduit segments 20 to define one half of each conduit segment 20, and separate panels may define the other half of the respective conduit segment 20, i.e., one panel for the first conduit segment 44 and another panel for the second conduit segment 46.

The conduit segment 20 is formed by connection lines 66, 68 connecting the respective panels 54, 56 along the conduit segment 20. The connection lines 66, 68 may be, for example, a line of stitches, a weld line, a bonding line, etc., that fixes the panels 54, 56 together to define the conduit segment 20. The connection lines 66, 68 separate the conduit segment 20 from the uninflatable segment 16. In the example shown in the Figures, the first panel 54 and the second panel 56 are fixed to each other along a first connection line 66 and a second connection line 68 on opposite sides of the conduit segment 20. The first panel 54 and/or the second panel 56 may be shaped so that the conduit segment 20 bulges relative to the uninflatable segment 16, e.g., in a direction transverse to the plane of the uninflatable segment 16 in examples in which the uninflatable segment 16 is planar. For example, in the example shown in the Figures, the first panel 54 bulges vehicle forward relative to the uninflatable segment 16 and the second panel 56 bulges vehicle forward relative to the uninflatable segment 16.

In the example shown in the Figures, one of the panels 54, 56 forms one side of the airbag segment 18 and the other of the panels 54, 56 forms the other side of the airbag segment 18. In the example shown in the Figures, the first panel 54 and the second panel 56 are fixed to each other defining the first airbag segment 48 between the first panel 54 and the second panel 56, defining the second airbag segment 50 between the first panel 54 and the second panel 56, and defining the third airbag segment 52 between the first panel 54 and the second panel 56. In other words, the three airbag segments 18 are defined between the same two panels 54, 56. In the example shown in the Figures, one panel 54, 56 defines a vehicle-forward portion of the airbag segment 18 and the other panel 54, 56 defines a vehicle-rearward portion of the airbag segment 18.

The airbag segment 18 is formed by connection lines 66, 68 connecting the respective panels 54, 56 along the airbag segment 18. The connections lines 66, 68 may be, for example, a line of stitches, a weld line, a bonding line, etc., that fixes the panels 54, 56 together to define the airbag segment 18. The connection lines 66, 68 separate the airbag segment 18 from the uninflatable segment 16. The first panel 54 and/or the second panel 56 may be shaped so that the airbag segment 18 bulges relative to the uninflatable segment 16, e.g., in a direction transverse to the plane P of the uninflatable segment 16 in examples in which the uninflatable segment 16 is planar. For example, in the example shown in the Figures, the second panel 56 bulges vehicle forward relative to the uninflatable segment 16 at the first airbag segment 48 and the second airbag segment 50, and the first panel 54 bulges vehicle forward relative to the uninflatable segment 16 at the third airbag segment 52 in the inflated position. The first panel 54 may be planar at the first airbag segment 48. In the example shown in the Figures, the first panel 54 is planar along the entire first airbag segment 48. In the example shown in the Figures, the first panel 54 is planar along a portion of the second airbag segment 50, and the second panel 56 is planar along a portion of the third airbag segment 52.

The inflation chambers 70 of one or more airbag segments 18 may be open to the inflation chamber 70 of another of the airbag segments 18. In the example shown in the Figures, the inflation chambers 70 of the second airbag segment 50 and the third airbag segment 52 are open to each other. In other words, a direct path exits between the inflation chambers 70 without extending through another airbag segment 18 or conduit segment 20, as shown in FIGS. 5A and 5B.

The airbag assembly 12 may include a tether retractor mounted to the vehicle body 24 and a tether extending from the tether retractor to the airbag 14. The tether retractor retracts the tether to pull the airbag 14 downwardly during inflation of the airbag 14 from the uninflated position to the inflated position. The tether retractor may be fixed directly to the vehicle body 24, e.g. a pillar, a vehicle 10 floor, etc. As an example, the tether retractor may be fixed to the vehicle body 24 with brackets, fasteners, etc. The tether is fixed to the airbag 14, e.g., by stitching, welding, adhesive, etc. The tether may be fabric, and in some examples may be of the same material type as the airbag 14 as described herein.

Figure 2:
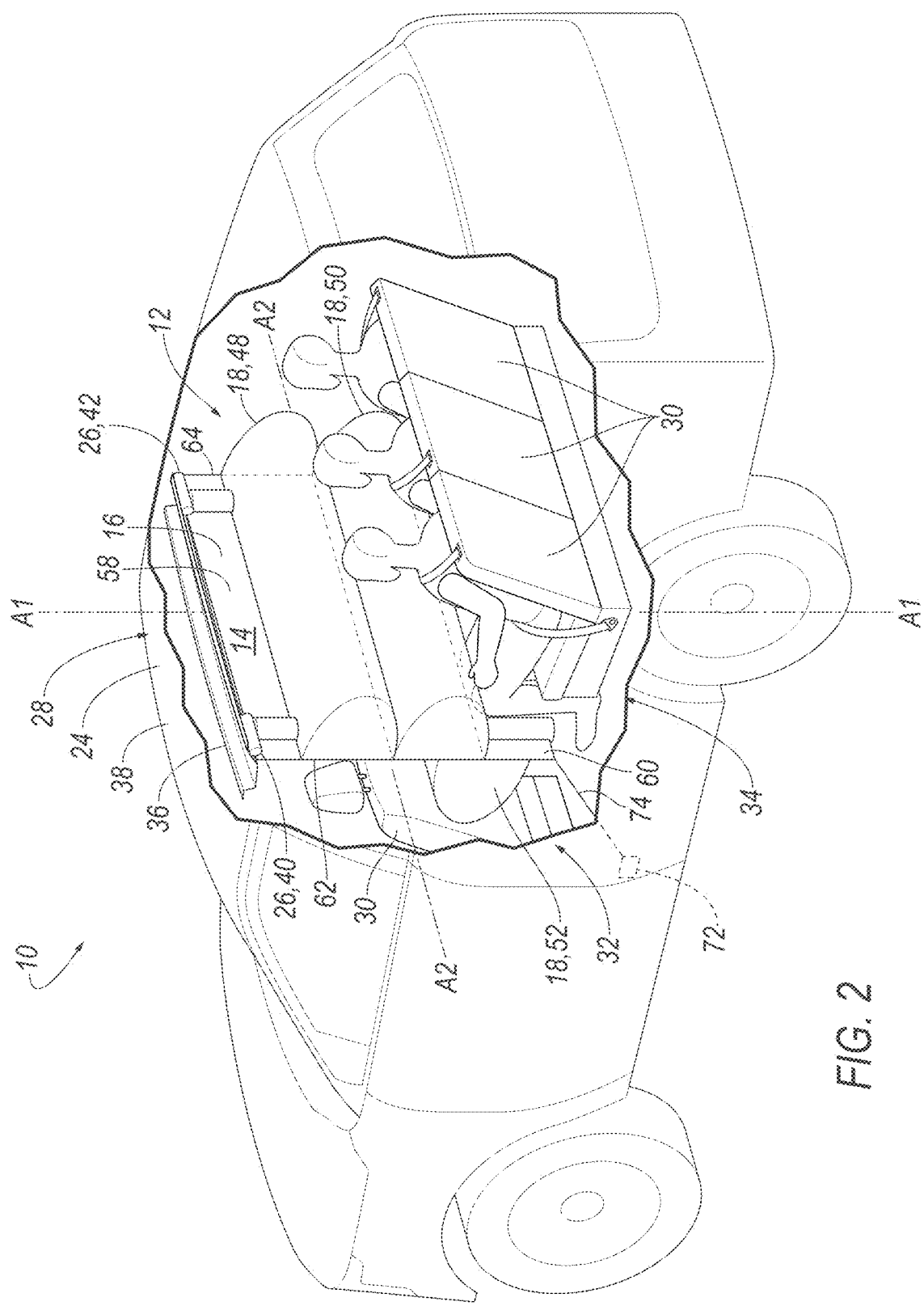
FIG. 2 is a perspective view of the passenger cabin of the vehicle with the airbag in an inflated position.
Figure 3:
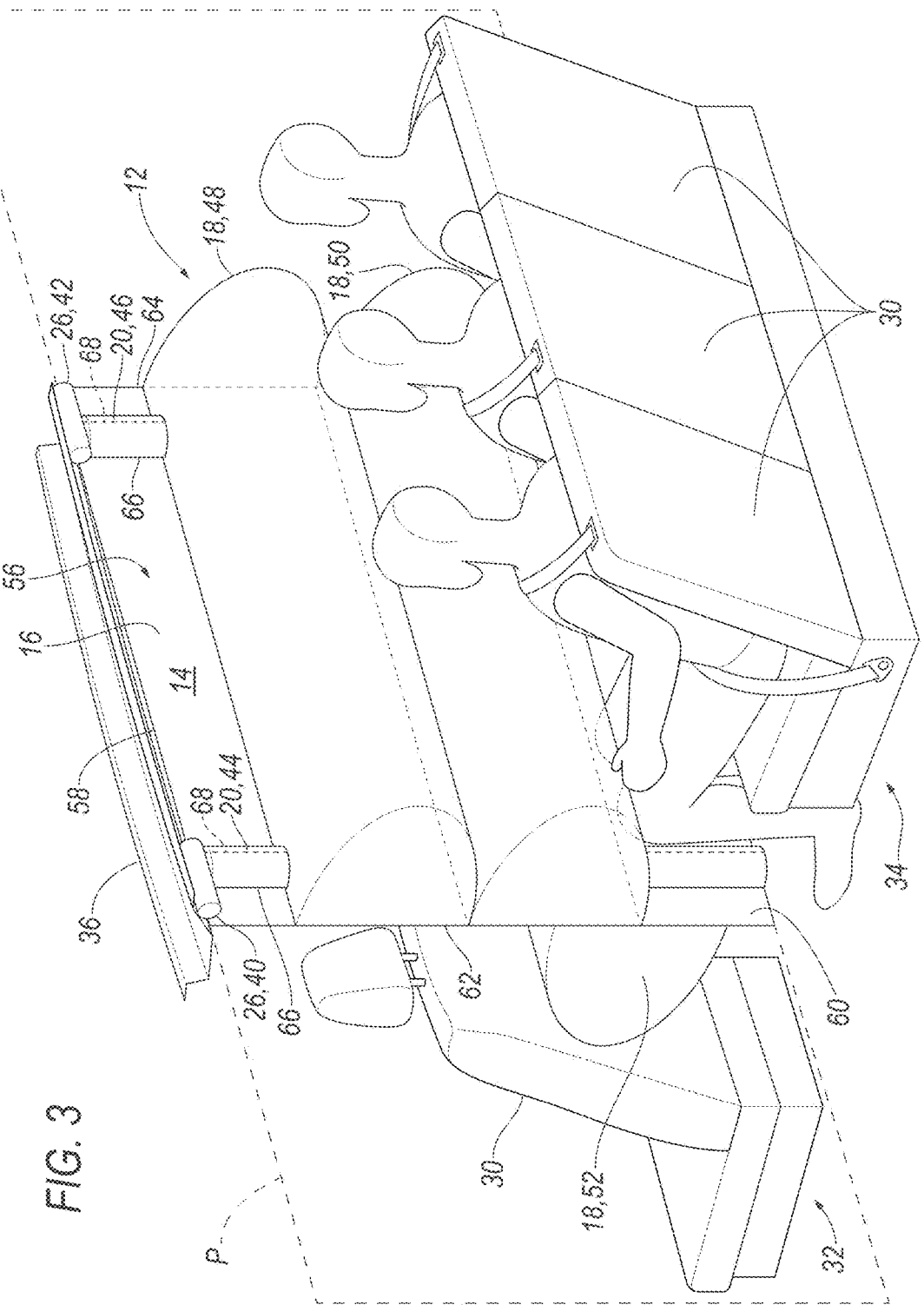
FIG. 3 is a perspective view of the airbag in the inflated position between a front row of seats and a rear row of seats.
Figure 4:
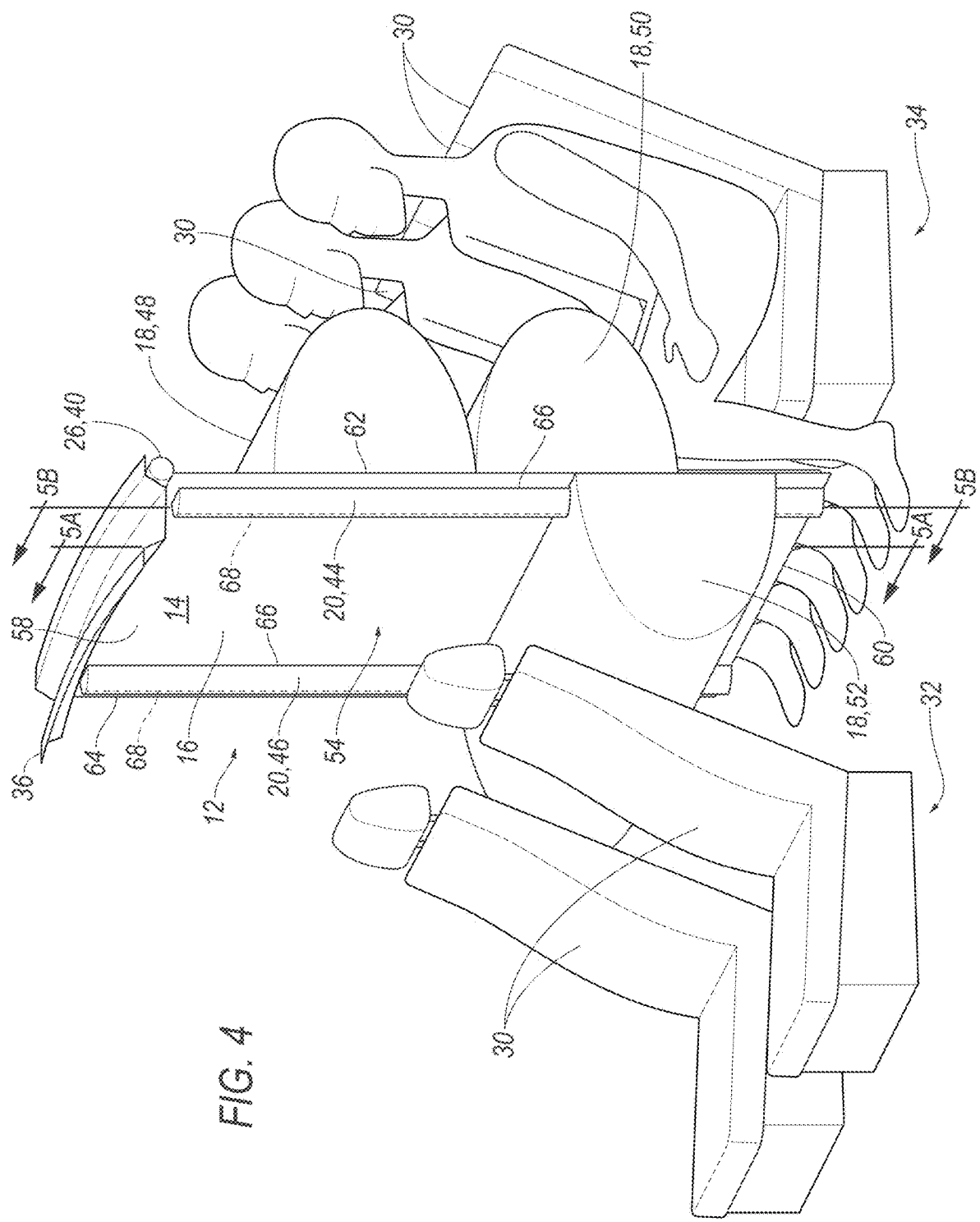
FIG. 4 is another perspective view of the airbag in the inflated position between the front row of seats and the rear row of seats.

The airbag assembly 12 may include at least one tether retractor 72 and one tether 74 connected to the airbag 14 to pull the airbag 14 downward during inflation of the airbag 14. In the example shown in the Figures, the airbag assembly 12 includes two tether retractors 72 and two tethers 74. One of the tether retractors 72 is shown in FIGS. 1 and 2 and it should be appreciated that another tether retractor, e.g., a mirror image of the one shown in the Figures, is on the other side of the passenger compartment. One of the tether retractors 72 is on a left side of the vehicle body 24 and is fixed to a left side of the airbag 14, and the other of the tether retractors 72 is on a right side of the vehicle body 24 and is fixed to a right side of the airbag 14.

The tether retractor 72 is operatively connected to the tether 74 to retract the tether 74. The tether retractor 72 may be pyrotechnically activated. In such an example, the tether retractor 72 may be any suitable type such as a rotary actuator, in which a pyrotechnic charge rotates a shaft connected to the retractable such that the tether 74 wraps around the shaft; a piston linkage, in which the pyrotechnic charge for example, drives a piston attached to the tether 74; a ball-in-tube linkage, in which an pyrotechnic charge propels a ball or balls over a cogwheel connected to the tether 74; a mechanical linkage, in which a compressed spring attached to the tether 74 is released; or any other suitable type.

The vehicle 10 includes a computer that controls the activation of the inflator 26, e.g., the first inflator 40 and the second inflator 42. In examples including the tether retractors 72, the computer controls the activation of the tether retractors 72. The computer may be, for example, a restraints control module. The computer includes a processor and a memory. The memory includes one or more forms of computer readable media, and stores instructions executable by the processor for performing various operations, including as disclosed herein. For example, the computer can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer. The memory can be of any type, e.g., hard disk drives, solid state drives, servers, or any volatile or non-volatile media. The memory can store the collected data sent from the sensors. The memory can be a separate device from the rest of the computer, and the computer can retrieve information stored by the memory via a network in the vehicle 10, e.g., over a CAN bus, a wireless network, etc.

The vehicle 10 may include at least one impact sensor for sensing certain vehicle impacts (e.g., impacts of a certain magnitude, direction, etc.), and the computer is in communication with the impact sensor and the inflator 26. The computer may activate the inflator 26, e.g., provide an impulse to a pyrotechnic charge of the inflator 26 when the impact sensor senses certain vehicle impacts. The impact sensor may be configured to sense certain vehicle impacts prior to impact, i.e., pre-impact sensing. The impact sensor may be in communication with the computer. The impact sensor is configured to detect certain vehicle impacts. In other words, a "certain vehicle impact" is an impact of the type and/or magnitude for which inflation of the airbag 14 is designed i.e., "certain" indicates the type and/or magnitude of the impact. The type and/or magnitude of such "certain vehicle impacts" may be pre-stored in the computer, e.g., a restraints control module. The impact sensor may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc.

The disclosure has been described in an illustrative manner, and it is to be understood that the terminology which has been used is intended to be in the nature of words of description rather than of limitation. The numerical terms adjectives such as "first," "second," and "third," (including with respect to the airbag segments 18 and the conduit segments 20) are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
a vehicle body;
an inflator supported by the vehicle body;
an airbag inflatable by the inflator downwardly from an uninflated position to an inflated position, the airbag including a first panel and a second panel being fixed to each other;
the airbag including an uninflatable segment supported by the vehicle body in the uninflated position and in the inflated position;
the airbag including a first airbag segment supported by the uninflatable segment in the inflated position and a second airbag segment supported by the uninflatable segment in the inflated position, the first airbag segment having an inflation chamber between the first panel and the second panel, and the second airbag segment having an inflation chamber between the first panel and the second panel; and
the airbag including a conduit segment supported by the uninflatable segment in the inflated position, the conduit segment extending from the inflator to the inflation chamber of the first airbag segment and the inflation chamber of the second airbag segment, the conduit segment fluidly connecting the inflation chamber of the first airbag segment and the inflation chamber of the second airbag segment to the inflator, the first panel and the second panel being fixed to each other along the conduit segment to define the conduit segment between the first panel and the second panel;

the first airbag segment protruding from the uninflatable segment in a first direction transverse to the uninflatable segment;

the second airbag segment protruding from the uninflatable segment in a second direction opposite the first direction and transverse to the uninflatable segment;

an upper boundary of the first airbag segment being above an upper boundary of the second airbag segment, a lower boundary of the second airbag segment being below a lower boundary of the first airbag segment, and the lower boundary of the first airbag segment being below the upper boundary of the second airbag segment so that the inflation chamber of the first airbag segment is open to the inflation chamber of the second airbag segment.

2. The vehicle as set forth in claim 1, wherein the conduit segment is elongated downwardly away from the inflator.

3. The vehicle as set forth in claim 2, wherein the first airbag segment is elongated cross-vehicle.

4. The vehicle as set forth in claim 1, wherein the first airbag segment is elongated cross-vehicle.

5. The vehicle as set forth in claim 1, further comprising a vehicle roof, the airbag being supported by the vehicle roof and inflatable downwardly from the vehicle roof to the inflated position.

6. The vehicle as set forth in claim 1, wherein the first panel and the second panel are fixed to each other along a first connection line and a second connection line on opposite sides of the conduit segment.

7. The vehicle as set forth in claim 1, wherein, in the inflated position, the first panel is planar at the first airbag segment and the second panel protrudes away from the first panel at the first airbag segment.

8. The vehicle as set forth in claim 7, wherein, in the inflated position, the second panel is planar at the second airbag segment and the first panel protrudes away from the second panel at the second airbag segment.

9. The vehicle as set forth in claim 8, further comprising a third airbag segment protruding from the uninflatable segment in the first direction and having an inflation chamber between the first panel and the second panel, in the inflated position, the first panel is planar at the third airbag segment and the second panel protrudes away from the first panel at the third airbag segment.

10. The vehicle as set forth in claim 9, wherein the first panel is connected to the second panel between the first airbag segment and the third airbag segment.

11. The vehicle as set forth in claim 1, wherein the airbag includes a second inflator and a second conduit segment supported by the uninflatable segment in the inflated position, the second conduit segment extending from the second inflator to the first airbag segment and fluidly connecting the first airbag segment to the inflator, the first airbag segment extending from the conduit segment to the second conduit segment.

12. The vehicle as set forth in claim 1, further comprising a front row of seats and a rear row of seats, the airbag being between the front row of seats and the rear row of seats in the inflated position.

13. The vehicle as set forth in claim 1, further comprising a vehicle roof, the inflator and the uninflatable segment being supported by the vehicle roof in the uninflated position and the inflated position;

the uninflatable segment extending downwardly in a direction away from the vehicle roof in the inflated position;

the conduit segment being elongated downwardly in a direction away from the vehicle roof; and the airbag being elongated cross-vehicle.

14. An airbag assembly comprising:

a first panel and a second panel being fixed to each other;

an uninflatable segment having a top end;

a first airbag segment inflatable to an inflated position, the first airbag segment being supported by the uninflatable segment in the inflated position;

a second airbag segment inflatable to an inflated position and supported by the uninflatable segment in the inflated position, the first airbag segment having an inflation chamber between the first panel and the second panel, and the second airbag segment having an inflation chamber between the first panel and the second panel; and a conduit segment fixed to the uninflatable segment and defining a gas passageway in fluid communication with the first airbag segment and the second segment, the first panel and the second panel being fixed to each other along the conduit segment to define the conduit segment between the first panel and the second panel;

the conduit segment being elongated along a first axis transverse to the top end of the uninflatable segment, and the first airbag segment being elongated along a second axis transverse to the first axis;

the first airbag segment protruding from the uninflatable segment in a first direction transverse to the uninflatable segment;

the second airbag segment protruding from the uninflatable segment in a second direction opposite the first direction and transverse to the uninflatable segment;

an upper boundary of the first airbag segment being above an upper boundary of the second airbag segment, a lower boundary of the second airbag segment being below a lower boundary of the first airbag segment, and the lower boundary of the first airbag segment being below the upper boundary of the second airbag segment so that the inflation chamber of the first airbag segment is open to the inflation chamber of the second airbag segment.

15. The airbag assembly as set forth in claim 14, wherein the first panel and the second panel are fixed to each other along a first connection line and a second connection line on opposite sides of the conduit segment.

16. The airbag assembly as set forth in claim 14, wherein, in the inflated position, the first panel is planar at the first airbag segment and the second panel protrudes away from the first panel at the first airbag segment.

17. The airbag assembly as set forth in claim 14, further comprising an inflator in fluid communication with the gas passageway of the conduit segment.

18. The airbag assembly as set forth in claim 14, further comprising:

a second conduit segment fixed to the uninflatable segment and defining a second gas passageway in fluid communication with the first airbag segment;

the second conduit segment being elongated along the first axis; and a second inflator in fluid communication with the second gas passageway.

* * * * *